United States Patent [19]

Mooney

[11] 4,310,136
[45] Jan. 12, 1982

[54] BACKLASH-FREE SWIVEL AND TILT MOUNTING

[75] Inventor: Paul C. Mooney, Northbrook, Ill.

[73] Assignee: Quick-Set, Incorporated, Northbrook, Ill.

[21] Appl. No.: 93,797

[22] Filed: Nov. 13, 1979

[51] Int. Cl.³ .............................................. E04G 3/00
[52] U.S. Cl. ..................................... 248/278; 248/183
[58] Field of Search .............. 248/278, 659, 652, 656, 248/183, 178; 308/189 A; 74/425; 352/69; 354/293

[56] References Cited

U.S. PATENT DOCUMENTS

| 324,042 | 8/1885 | Shepard | 74/425 X |
|---|---|---|---|
| 434,472 | 8/1890 | Simonds | 308/189 A UX |
| 637,329 | 11/1899 | Feix | 308/189 A UX |
| 893,032 | 7/1908 | Sweet | 74/425 X |
| 1,898,185 | 2/1933 | Howell. | |
| 2,306,862 | 12/1942 | Bown. | |
| 2,516,069 | 7/1950 | Newhouse et al. | |
| 3,164,838 | 1/1965 | Heinrich | 352/69 |
| 3,742,781 | 7/1973 | Boyriuen | 74/425 X |

FOREIGN PATENT DOCUMENTS 1351760  3/1963  France .......................... 308/189 A Primary Examiner—J. Franklin Foss
Attorney, Agent, or Firm—Wegner, Stellman, McCord, Wood & Dalton

[57] ABSTRACT

A mounting arrangement which utilizes an oversized support shaft journaled in dual ball bearings in conjunction with worm gearing and axially adjustable set screws eliminates rotational and axial backlash in a swivel and tilt mounting for television surveillance cameras or other equipment which must be directionally adjustable. The mounting arrangement permits standard manufacturing and assembly techniques to be utilized while allowing simplified disassembly, repair and adjustment.

4 Claims, 3 Drawing Figures

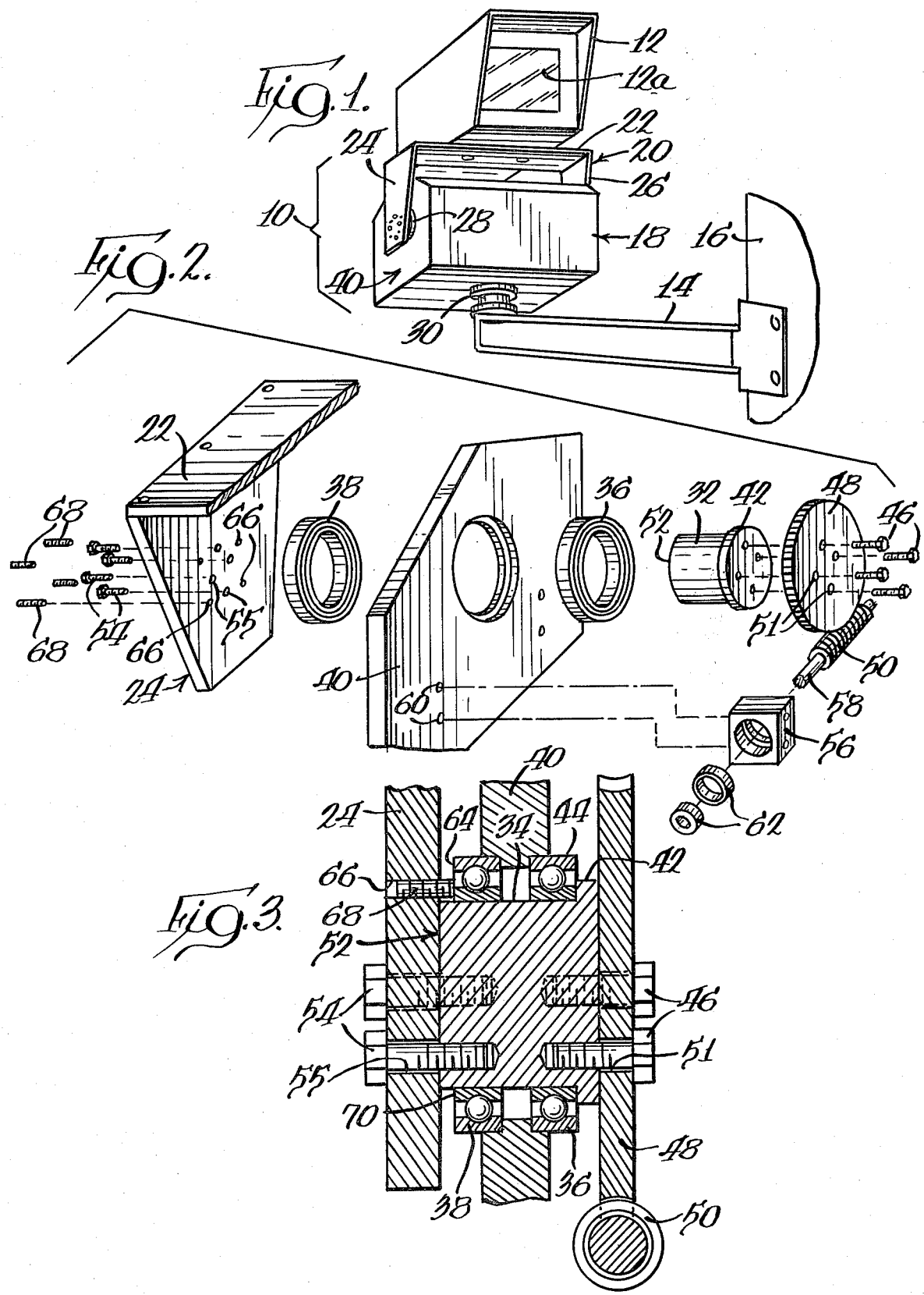

BACKLASH-FREE SWIVEL AND TILT MOUNTING

BACKGROUND OF THE INVENTION

This invention relates to mounting systems having tilt and swivel capability used in connection with equipment which must be frequently and accurately directionally repositioned. In particular, the subject matter of this invention is a mounting system for remotely controlled television surveillance systems or directional antennas such as those used in microwave transmission systems.

The demand for stable and reliable motorized mounting systems which may be remotely controlled has been increasing as the versatility and sophistication of the associated equipment increases. For example, television surveillance systems are presently used to permit observation of processes taking place in hostile environments, to allow observation of potentially dangerous areas without endangering the operator, and to expand the senses of the operator by permitting observation of events taking place at great distances. These systems are presently being used extensively in locations such as foundries, banks, and airports.

Mounting systems are presently available which permit full 360° rotation, a so-called "panning" operation, and also permit the camera to be raised and lowered a full 180°, a so-called "tilt" operation. Unfortunately, the stability of these mounting systems has not kept pace with the increased demands being placed upon them. This problem may be illustrated by recognizing that when a camera is used to observe an event taking place at a distance of 1,000 yards, which is common in an airport setting, a camera deviation of merely 1° will cause the camera focus to move approximately 50 feet. In view of these demanding conditions, a mounting system which allows no free movement of the camera and remains positioned under such varying load conditions as those caused by gusting winds, becomes a very real necessity.

Present systems generally include a rectangular base which contains the motor and drive system. The drive rotates a shaft extending through opposite sides of the base. Attached to the ends of the shaft are the depending legs of an inverted U-shaped frame upon which is mounted the device to be directionally positioned. Rotation of the shaft thus causes the camera to tilt. A similar arrangement connects the base to a support and allows the system to swivel or pan. The shafts are generally of a small diameter, approximately 1", and are attached to the drive gears by means of a key and set screw arrangement. Normal machining tolerances generally permit some free play or "backlash" between the drive gear and the shaft and frequently between the shaft and the frame legs. Backlash results in slight but undesirable motion of the camera relative to the support frame in both the tilt and pan directions causing the camera focus to deviate from the object to be viewed.

While methods are available to reduce or eliminate these backlash problems, such as welding the shaft to the support legs and drive gear or reducing manufacturing tolerances, these solutions either preclude the possibility of disassembly or increase manufacturing costs.

Axial free play between the shafts and their bearings causes the same undesirable camera motion, and it has therefore been necessary in existing systems to incorporate relatively complicated and expensive means to reduce axial movement of the shaft relative to the base.

Thus, while these systems have proven workable and adequate in the past, the rotational and axial backlash inherent in these systems can no longer be tolerated in the presently more sophisticated surveillance systems.

Considering the drawbacks present in existing mounting systems, I have developed a mounting system which eliminates relative rotational and axial movement between the camera frame and the base and between the base and the ultimate camera support, which may be manufactured and assembled by conventional methods, and which may be easily and quickly disassembled for repair or adjustment.

SUMMARY OF THE INVENTION

One depending leg of an inverted U-shaped mounting frame is bolted to one end of an oversized support shaft journaled in dual bearings secured to a rectangular base. The other end of the shaft has an increased diameter shoulder which bears against the inner race of one of these support bearings. The end of the support shaft adjacent the shoulder has a flat surface which is bolted directly to the mechanism drive gear.

The support shaft has a diameter much greater than would be required for mechanical support of the mounting frame and camera in order to provide large surface areas for attachment to the drive gear and frame leg. Multiple bolts may then be used to rigidly connect the gear and frame leg by friction alone which further permits the bolt holes in the gear and frame to be large-tolerance clearance holes.

It is desirable that the drive gear be driven through either single or double enveloping worm gearing in order to permit the elimination of both backlash between the worm and the drive gear and axial play of the drive worm by conventional means.

The oversized support shaft is intentionally manufactured so its length is greater than the overall outer width of the bearing assembly to permit the shaft to be manufactured without closely controlled tolerances. The resulting axial clearance is eliminated by providing multiple set screws in the frame leg which bear upon the inner race of the outer bearing to draw the support shaft outwardly and place the bearing assembly in compression.

The foregoing arrangement completely eliminates relative rotational and axial motion between the base and the camera support frame and may be used either singly, in a cantilevered frame arrangement, or if equipment weight demands, combined with a conventional bearing located on the opposite side of the base.

An identical gearing, shaft and bearing arrangement is located on the bottom surface of the base between the mount and a fixed support to permit the entire unit to be swiveled or "panned" without permitting unwanted relative motion between the base and support.

While the primary object of this invention was to eliminate relative motion between the various supporting parts of the mounting, it will be apparent that the above-described arrangement results in other desirable features. For example, use of this arrangement eliminates the necessity of extending a shaft completely through the mounting base in order to support the frame. Thus, the entire unit can be made more compactly since additional room inside the base is available for the drive mechanisms and control elements. Also, use of an exceptionally large diameter support shaft and bearing assembly will decrease component wear and thereby greatly increase the useful life of the mounting system.

Other objects, aspects and features of this invention will become apparent through close inspection of the drawings, specification and appended claims.

BRIEF DESCRIPTION OF THE DRAWINGS

FIG. 1 is a perspective view of the mounting system used in conjunction with a surveillance camera;

FIG. 2 is an exploded view of the gearing and support shaft arrangement showing the worm gear support, base side wall, and a portion of the mounting frame;

FIG. 3 is a partial vertical sectional depicting the relationship between the drive gear, base side wall and frame leg.

DESCRIPTION OF THE PREFERRED EMBODIMENT

Referring to the drawings, and particularly FIG. 1, a motorized, remotely controlled mounting unit, generally indicated by the numeral 10, is shown supporting a television surveillance camera enclosure 12 aimed to view through a transparent front window 12a. The mounting unit is in turn supported by a stationary support 14 shown attached to the corner of a building 16. Although the mounting unit 10 is shown used in conjunction with a television surveillance camera, it is apparent that any device in which directional control would be necessary or useful, and which could be adapted to the mounting unit 10, could be substituted for the television camera. The mounting could therefore equally well be used with microwave transmitters or receivers, spotlights, and so forth. Further, the support strut 14 and building 16 are shown for illustrative purposes only, and it should be recognized that any supporting structure, such as a tower or pole, could be substituted.

The mounting unit 10 consists of a base unit 18 and a mounting frame 20. The base 18 must be large enough to contain drive motors (not shown) which will cause the unit 10 to pan and/or tilt in response to command signals originating at a remote location and directed to the unit 10 by conventional means which may be, for example, a cable.

The mounting frame 20 is formed in the shape of an inverted U and consists of an equipment support table 22 and depending legs 24 and 26. As will be more fully explained below, if the equipment to be supported is relatively light, one of the depending legs 24 or 26 may be eliminated and the equipment supported in cantilever fashion. The frame member 20 may be formed from a continuous piece of material or may be manufactured by welding or fastening separate pieces to each other.

Located between the base unit 18 and one or both depending legs 24, 26 is a shaft and bearing assembly 28, which allows the camera housing 12 to be lowered or elevated ("tilted") 90° from the horizontal in either direction. A similar shaft and bearing assembly 30 connects the base unit 18 and the support 14 to permit the entire mounting unit 10 and the attached housing 12 to be rotated ("panned") a full 360° or any lesser arc which may be desired.

Construction of the shaft and bearing assemblies 28, 30 is illustrated in FIGS. 2 and 3 which depict the assembly in exploded and sectional views, respectively.

A large diameter support shaft 32 consists of an elongated circular cylindrical section 34 which is journaled in dual bearings 36 and 38 and extends from the interior of the base unit 18 through a base side wall 40. The support shaft 32 also includes a cylindrical shoulder section 42 the diameter of which is greater than the diameter of cylinder 34 but less than the inner diameter of the outer bearing race 44.

The cylindrical shoulder section 42 is attached by multiple bolts 46 to a gear 48, which is the output gear of a worm 50 and gear combination.

The diameters of the shaft 32, shoulder 42 and gear 48 are not critical except that the diameters must be large enough to accommodate a number of bolts 46 adequate to prevent relative motion between the cylinder 32 and the gear 48 through friction alone. The use of bolts will permit easy disassembly and allows clearance holes 51 to be formed in the gear 48, permitting standard manufacturing methods to be used.

The width of the shoulder 42 is also not critical, however, as best seen in FIG. 3, the width of the shoulder 42 largely determines the spacing between the gear 48 and the base side wall 40 and thus also the spacing between the longitudinal axis of the worm 50 and the side wall 40. It is desirable to keep the worm 50 and gear 48 as close as possible to the side wall 40 in order to provide increased free space within the base 18 for the motors and controls, but it is necessary that the spacing be such that clearance is provided between the side wall 40 and any drive members (sprockets, gears, belt pulleys) which may be attached to the worm 50. It is sufficient to recognize that the spacing distance may be varied by altering the height of the shoulder 42.

While the shaft 32 and the gear 48 may be formed from a single piece of stock material, the single piece must still retain the shoulder 42 to provide the above-mentioned spacing and a surface which bears against the bearing 36.

The end 52 of the shaft 32 opposite the cylindrical shoulder 42 is likewise attached to depending frame leg 24 by multiple bolts 54. As indicated above, the bolts allow easy disassembly and clearance holes 55 to be used in the leg 24. The number and size of bolts 54 to be used depends upon the frictional force which must be generated between the leg 24 and shaft 32 to preclude relative motion under all operating conditions.

Since both the leg 24 and the gear 48 are rigidly attached to the shaft 32, any rotational free play or "backlash" which would result in undesirable tilting of the camera 12 can only come from either longitudinal motion of the worm 50 or gear tooth backlash between the worm 50 and the gear 48. Manufacturing convenience and cost reduction may be aided by utilizing four machine screws to fasten leg 24, shaft 32 and gear 48 together, such screws passing through leg 24, shaft 32 and into threaded openings 51 in the gear.

To eliminate these possible sources of unwanted rotational motion, the worm 50 is provided on either end with adjustment blocks 56 (only one of which is shown) which are attached by bolts (not shown) to the side plate 40 and which may be adjusted toward or away from the center of the gear 48 to eliminate gear tooth backlash. Adjustment of the blocks 56 may be accomplished by providing clearance holes 60 or slots in the side wall 40. Longitudinal motion of the worm 50 is adjusted with an adjustment nut (not shown) applied to the shaft of the worm and bearing upon one of the blocks 56. Tightening of the adjustment blocks' 56 attachment bolts will then retain the blocks 56 in proper alignment.

While it is preferred that worm type gearing be used so backlash may be easily eliminated by the conventional means outlined above, other well-known power transmission systems could be used to impart rotation to the shaft 32 provided backlash may be eliminated from the power train utilized.

Since the frame leg 24 is rigidly attached to the gear 48 by the shaft 32 and free play has been eliminated in the worm 50 and between the worm 50 and the gear 48, the support frame 20 cannot rotate relative to the base 18 unless the worm 50 is rotated by the motor.

As shown most clearly in FIG. 3, the cylindrical section 34 of the support shaft 32 is formed to a length slightly greater than the overall width of the bearing combination 36, 38. The particular distance between the outer edge 64 of the bearing 38 and the outer surface 52 of shaft 32 is not critical and permits the shaft 32 to be economically manufactured since close tolerances need not be maintained.

Because of the gap produced between the bearing 38 and the side plate 24 by the excess length of the shaft 32, axial motion of the support shaft 32 might be possible which would in turn cause transverse motion of the camera 12. To prevent such axial motion, the side plate 24 is provided with multiple threaded holes 66 which receive threaded set screws 68. The side plate holes 66 are positioned around the circumference of the shaft 32 such that their associated set screws 68 will bear upon only the inner race 70 of the outer bearing 38. Tightening of the set screws 66 will thus force the side plate 24 away from the bearing 38 thus drawing the shaft 32 toward the left, as viewed in FIG. 3, until the shoulder 42 contacts the inner bearing 36.

When the set screws 66 are properly adjusted, the bearing combination 36, 38 will be in compression between the shoulder 42 and the set screws 66 thus eliminating any relative motion between the shaft 32 and bearings 36, 38 which would otherwise be present due to the length of the shaft 32.

Dual bearings 36, 38 are shown supporting the shaft 32 in order to provide a wide and stable base for this shaft 32. Because of this wide supporting area, the shaft 32 and bearing 36, 38 arrangement may be used singly in cantilever fashion wherein a depending leg 26 is eliminated and the support frame only consists of depending leg 24 and horizontal support table 22. Alternatively, if the weight of the equipment to be supported demands, depending leg 26 may be included and connected to the base 18 by means of a conventional bearing arrangement. Since all rotational and axial free movement is precluded by the single shaft 32 and bearing 36, 38 assembly, this assembly need not be duplicated on the remaining depending leg 26.

It will be recognized that if a cantilever arrangement were not or could not be used, dual bearings 36, 38 need not be provided since a wide support base would not be necessary. The dual bearings 36, 38 could be replaced by a single bearing without changing the relationship or beneficial functions of the parts heretofore described. A wide variety of bearing sizes and types, such as double row ball, tapered roller, or angular contact ball bearings, could be utilized without departing from the spirit of this invention.

While the specific arrangement illustrated utilizes the shaft 32 with its shoulder 42 between bearing 36 and gear 48, a reversal of the shaft may be made to place the shoulder 42 between the leg 24 and inner race 70 of outer bearing 64. In the latter position, set screws 68 would be threaded into the gear 48 to engage the inner race of bearing 36, to perform in the same fashion as described. Threaded holes would be provided in the gear 48 similar to the holes 66 illustrated as present in the leg 24. It may also be desirable to substitute a spring for the set screws, such as a wavy washer configuration which will exert force upon one inner race as the leg 24, shaft 32 and gear 48 are tightened together. Use of such a spring would tend to eliminate personal judgment relative to the amount of tightening of the set screws desirable.

Thus far, a system has been described which would eliminate unwanted relative motion between the base 18 and the support frame 20. Also present in the mounting system, however, is movement between the base 18 and the fixed structural support 14. The base 18 must be allowed to rotate relative to the structure 14 without allowing any unwanted motion to be transmitted to the camera enclosure 12. A shaft 32 and bearing 36, 38 assembly is thus provided between the base 18 and the support 14 which contains parts which are structured and cooperate identically to the assembly positioned between the base 18 and the frame 20. In the same manner as described above, relative rotational or axial movement between the base 18 and structure 14 is precluded.

Since all unwanted free play is eliminated at every system pivot point, no motion of the camera enclosure 12 relative to the support 14 can occur. The system thus described allows panning and tilting the camera enclosure 12 without permitting the camera to jiggle or lose focus due to shock or variable winds after being positioned.

I claim:

1. An improved pan and tilt mounting for a television camera or the like comprising:
   a fixed support;
   a base having top and bottom surfaces, front and back walls, and side walls rotatably connected to said fixed support at said bottom surface;
   a support frame attached to said camera and rotatably connected to said base side wall;
   a first bearing assembly including dual ball bearings having inner and outer races respectively attached to said side wall and located in a bore formed in said side wall,
   a second bearing assembly including dual ball bearings having inner and outer races respectively attached to said bottom surface and located in a bore formed in said bottom surface;
   a first shaft journaled in said first bearing assembly including a cylindrical portion extending through the beyond both inner races of said first bearing assembly, said cylindrical portion being rigidly connected to said support frame, and a raised shoulder abutting the inner race of one of said bearings;
   a second shaft journaled in said second bearing assembly including a cylindrical portion extending through and beyond both inner races of said second bearing assembly, said cylindrical portion being rigidly attached to said fixed support, and a raised shoulder abutting the inner race of one of said bearings;
   drive means associated with each of said first and second shafts having a backlash free drive train and including a power output which is rigidly attached to the ends of said first and second shafts adjacent said shaft shoulders; and adjustment means including projections which bear upon the inner races of the bearings remote from the shaft shoulders and which may be adjusted to maintain contact between said bearing inner races and said shaft shoulders at all times.

2. The improved mounting of claim 1 wherein said drive outputs are connected to said first and second shafts by multiple bolts threaded into each shaft.

3. An improved pan and tilt mounting for a television camera and the like, comprising:

a fixed support secure against vibration of a magnitude capable of distorting visibly discernible television transmittal signals;

a movable camera support table tiltable relative to the fixed support, said table having an upright portion intersecting a generally horizontal axis of tilt for the table and its supported camera;

a mounting system for said camera support table including a bearing hub, a worm gear against one end of the hub and the upright portion of the table located against the other end of the hub, each of said hub, gear and table portion being provided with motion-free association relative to each other at their respective locations of joining;

a pair of roller bearings having outer races mounted in the fixed support and inner races supporting said hub, said hub having a shoulder bearing upon only the inner race of one bearing and pressure applying means against one of said worm gear and table upright portion positioned to urge the other bearing race toward said hub shoulder, so that said pressure applying means and shoulder may take up tolerances and play in the mounting of the table to the support and whereby the table is as vibration free as the worm gear and moves only with the movement of the worm gear.

4. The pan and tilt mounting for a television camera specified in claim 3 wherein the mounting system includes a panning support for the table movable about an upright axis, said support being between said table and said fixed support and having a mounting which is vibration free relative to said fixed support.

* * * * *